United States Patent [19]
Wilkinson

[11] Patent Number: 5,942,120
[45] Date of Patent: Aug. 24, 1999

[54] COMPOSITE MICROPOROUS ULTRAFILTRATION MEMBRANE, METHOD OF MAKING THEREOF, AND SEPARATION METHODS

[76] Inventor: Kenneth Wilkinson, 1010 Glenwood Blvd., Waynesboro, Va. 22980-3411

[21] Appl. No.: 08/985,251

[22] Filed: Dec. 4, 1997

[51] Int. Cl.$^6$ ............................ B01D 61/00; C02F 1/44
[52] U.S. Cl. .................... 210/651; 210/490; 210/500.29; 210/500.38; 210/500.4; 210/500.41; 210/652; 264/41; 264/49
[58] Field of Search ............................ 210/490.651, 652, 210/500.29, 500.38, 500.4, 500.41, 500.42; 264/41, 49

[56] References Cited

U.S. PATENT DOCUMENTS

| | | |
|---|---|---|
| 3,215,486 | 11/1965 | Hada et al. . |
| 3,231,530 | 1/1966 | Prahl . |
| 3,341,627 | 9/1967 | Wilkinson . |
| 3,717,689 | 2/1973 | Tanaka et al. . |
| 3,853,601 | 12/1974 | Taskier . |
| 4,242,159 | 12/1980 | Klimmek et al. ........................ 210/490 |
| 4,260,652 | 4/1981 | Taketani et al. ........................ 210/490 |
| 4,268,641 | 5/1981 | Koenig et al. ............................ 525/367 |
| 4,277,344 | 7/1981 | Cadotte .................................... 210/654 |
| 4,280,970 | 7/1981 | Kesting .................................... 210/650 |
| 4,388,189 | 6/1983 | Kawaguchi et al. .................... 210/490 |
| 4,976,897 | 12/1990 | Callahan et al. . |
| 5,266,391 | 11/1993 | Donato et al. .......................... 210/490 |
| 5,525,236 | 6/1996 | Wilkinson ................................ 210/651 |

FOREIGN PATENT DOCUMENTS 981991  1/1976  Canada .

*Primary Examiner*—John Kim
*Attorney, Agent, or Firm*—Leander F. Aulisio

[57] ABSTRACT

Microporous ultrafiltration membranes containing polymeric material having oxyalkylene tentacles dangling from a carbon backbone can be improved for separation of micromaterials such as salts, unicellular pathogens and the like by separating said tentacles further part on the carbon backbone.

33 Claims, No Drawings

COMPOSITE MICROPOROUS ULTRAFILTRATION MEMBRANE, METHOD OF MAKING THEREOF, AND SEPARATION METHODS

BACKGROUND OF THE INVENTION

The present invention relates to an improvement in polymeric additives for ultrafiltration membranes and processes for purification of water and the like.

The process of reverse osmosis involves the transport of solvent by pressure gradient larger and opposite to osmotic gradient. Ultrafiltration membranes are employed as suitable mediums for reverse osmosis. In the past, it has been an object of ultrafiltration to produce a purified water permeate that is free of organic contaminants, inorganic contaminants, salts, bacteria and microorganisms.

Components which are retained in an ultrafiltration membrane are called collectively concentrate or retentate. Materials which pass through the membrane are called filtrate, ultrafiltrate or permeate.

Membranes are typically selected on how they transport the fluids therethrough. The rate of transport through a membrane is a function of its permeability, generally referred to as flux. Liquid permeation for example, involves the permeation of feed components from the liquid phase on one side of the membrane to the liquid phase on the other side at a controlled rate.

Microporous membranes can be classified into two general types: one type in which the pores are interconnected, i.e., a closed-cell membrane, and the other type in which the pores are essentially interconnected through passages which may extend from one exterior surface or surface region to another, i.e., an open-celled membrane.

Currently available microfiltration membranes are made from essentially hydrophobic polymers such as cellulose nitrate, cellulose acetate, blends of cellulose nitrate and cellulose acetate, cellulose triacetate, polycarbonate, and polysulfone, as well as other polymers. Membranes of these materials, once formed, are usually rendered hydrophilic by the inclusion of surfactant in the casting solution or by a post membrane formation treatment consisting of immersing the material in an aqueous solution of the surfactant. In both cases, although wettability is imparted, the membranes typically contain between 2 and 6% of water extractable (leachable) materials which are potential contaminants of any filtrate.

Another approach to application of a coating to the microporous membrane is to change the surface of the hydrophobic microporous membrane to a hydrophilic one. This is especially true when polyolefinic films, a preferred type of polymeric material often employed in the manufacture of microporous membranes, are employed. Because these films are not "wetted" with water and most aqueous solutions, they could not be used advantageously in various applications. Such proposals have been put forth in the past to overcome these problems, such as exemplified by U.S. Pat. Nos. 3,853,601; 3,231,530; 3,215,486 and Canadian Patent No. 981,991 which utilize a variety of hydrophilic coating agents or impregnants. Such coating agents or impregnants, although effective for a limited period of time tend to be removed in a relatively short period of time by solutions which contact the membrane.

As discussed above, the selectivity of separation membranes is an important factor in the satisfactory operation of membrane separation processes. In addition, membrane properties such as flux and resistance to chemical, biological and physical degradation also affect the efficiency of separation processes.

Of course, there have been many efforts to develop membranes which function efficiently in separation processes. Typical of such efforts include the development of composite-type membranes such as those disclosed in U.S. Pat. Nos. 4,242,159; 4,260,652; 4,277,344 and 4,388,189. These membranes include a microporous support having coated thereon a thin layer of polymeric material. However, previously known composite membranes have not been completely satisfactory since they can or may exhibit a variety of defects which affect physical, chemical and biological degradation resistance and flux, and thus the overall efficiency of the membrane processes for which they are used.

U.S. Pat. No. 4,268,641 (Koenig et al.) discloses thickening agents comprising copolymers of acrylic acid and polyoxyalkylene(meth)acrylates. The copolymers contain about 1 to about 10 mole % of the nonionic (meth)acrylate. There is no disclosure relating to the formation of ultrafiltration membranes.

U.S. Pat. No. 3,341,627 (Wilkinson) discloses a polymeric anti-static agent comprising polymers prepared from alkylphenoxy polyethylene glycol acrylate monomers. There is no disclosure relating to the formation of ultrafiltration membranes.

U.S. Pat. No. 4,280,970 (Kesting) discloses hydrophilic membranes consisting essentially of the graft copolymer of an active hydrogen containing membrane forming polymer, a diisocyanate grafting link, and an active hydrogen containing polyoxyethylene polymer. The membrane forming polymer can be a cellulosic polymer or nylon. The grafting operation can be performed either before or after membrane formation. IGEPAL CO-990 is disclosed (column 3, line 44). The membranes can be employed in ultrafiltration processes. There is no disclosure with reference to a polymeric additive for ultrafiltration membranes.

U.S. Pat. No. 5,266,391 (Donato et al.) discloses a coated microporous membrane comprising a microporous polymeric film support having specified physical attributes and coated on at least one side with a polymer such as polyethylene oxide. In a preferred embodiment, the support is open-celled.

U.S. Pat. No. 4,976,897 (Callahan et al.) discloses a composite membrane having a microporous support coated with a UV curable polymer composition. The UV curable polymer can have additives such as nonylphenoxypolyoxyethylene surfactants (IGEPAL-type) (column 5, line 30).

U.S. Pat. No. 3,717,689 (Tanaka et al.) discloses copolymers prepared from a monoester and a diester. The monoester is a mixed polyoxyalkylene ester of (meth)acrylic acid. There is no disclosure to the use of the copolymer as additives in the preparation of ultrafiltration membranes.

U.S. Pat. No. 5,525,236 (Wilkinson) discloses a microporous ultrafiltration membrane comprising a hydrophobic polymer and a polymer prepared by the addition polymerization of a polyoxyalkylene alkyl phenyl ester of (meth)acrylic acid. The hydrophobic polymer can be a cellulosic polymer, a polyamide, a polycarbonate or a polysulfone. The polyoxyalkylene-containing polymer can be a copolymer prepared with a vinyl comonomer or monomers which lack the polyoxyalkylene moiety. Said comonomers are present in the copolymer in an amount up to about 10 mole % (Col. 6, line 42).

SUMMARY OF THE INVENTION

An object of this invention is to provide polymeric additives and a process for preparing ultrafiltration membranes containing the additives.

Another object of this invention is to provide a process for the preparation of purified, desalinated water. The process comprises the steps of obtaining a microporous ultrafiltration membrane comprising a hydrophobic polymer and about 1% to about 10% by weight based on the membrane of a water-insoluble addition copolymer comprising a first comonomer which is an alkylphenoxy polyalkylene glycol acrylate having the formula:

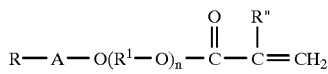

wherein R is an alkyl radical of from 5 to 20 carbon atoms, A is a phenylene radical, $R^1$ is a member selected from the group consisting of propylene, ethylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1; contacting an amount of unpurified water with the ultrafiltration membrane under reverse osmosis conditions to effectively separate water from salts, bacteria, organic contaminants, inorganic contaminants and microorganisms; and withdrawing a purified stream of water. Preferably, RA— is a nonyl phenyl radical, R" is hydrogen and $R^1$ is ethylene.

Copolymers of the present process can be tailored to give any of a number of desired results. This can be accomplished by adjusting the type and amount of the second comonomer, which is devoid of the polyoxyalkylene group, in the polymerization process. An increase in the content of the second comonomer causes the polyoxyalkylene units in the copolymer to be further apart, resulting in fewer passageways. Small molecules such as sodium chloride cannot pass through the copolymer which contains fewer passageways.

A composite microporous ultrafiltration membrane is disclosed which comprises a hydrophobic polymer and a water-insoluble addition copolymer comprising a first comonomer which is an alkylphenoxy polyalkylene glycol acrylate having the formula:

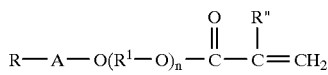

wherein R is an alkyl radical of from 5 to 20 carbon atoms, A is a phenylene radical, $R^1$ is a member selected from the group consisting of propylene, ethylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1. In a preferred embodiment, the hydrophobic polymer is a member selected from the group consisting of cellulosic polymers, polyamides, polycarbonates and polysulfones. It has been observed that best results are obtained when the water-insoluble addition polymer is present in the composite membrane in an amount of about 1% to about 20% by weight based on the membrane.

DETAILED DESCRIPTION OF THE INVENTION

Ultrafiltration membranes are prepared by gelation or precipitation of a species from a soluble phase (phase inversion). The polymeric material is dissolved in a mixture of miscible solvents and nonsolvents. The solution is deaerated and cast to produce a film whose surface contacts the nonsolvent diluent miscible with the solvent forming a membrane skin. The membrane skin in highly stressed due to polymer consolidation. The surface of the skin tears at polymer-poor sites, forming cracks or pores. The pores develop into "fingers" by drawing precipitating polymer from the bottom to the side of the pores. This process advances along a moving boundary into the polymer film, preventing additional pores from forming on the walls. Any polymer solution trapped behind the precipitated walls continues to gel into an open-sponge structure. The final structure of the membrane is dependent upon the materials employed (polymer composition, molecular weight distribution, solvent system, etc.) and the method of preparation (solution viscosity, evaporation time, humidity, etc.).

Ultrafiltration is a pressure-driven filtration separation occurring on a molecular scale. In reverse osmosis filtration four basic membrane designs are utilized: plate-and-frame, tubular, spiral-wound, and hollow-fiber. The spiral-wound and hollow-fiber designs are those which are commercially used.

Hollow-fiber membranes have become popular in the recent era. A hollow-fiber is a capillary having a diameter of $\leq 1$ mm, and whose wall functions as a semi-permeable membrane. The fibers are cylindrical membranes that permit selective exchange of materials across their walls. The walls can be thick or thin. The fibers can be "open" or "loaded". In "open" hollow-fibers, the flow of the lumen fluid is not restricted. In "loaded" hollow-fibers, the lumen fluid passes through an immobilized solid, liquid or gas which is contained in the lumen of the fibers.

Hollow-fiber membranes have advantage over flat-sheet and tubular membranes. They give higher productivity per unit volume and are self-supporting structures. Some disadvantages are fouling and plugging by particulate matter.

Hollow-fiber membranes are prepared by fiber fabrication from spinnable materials followed by cementing together (potting) of hollow-fiber bundles. Composite hollow-fiber membranes comprise highly porous substrates which support ultrathin semipermeable membranes.

Porosity in prior art membranes is achieved by formation of voids and imperfections in the support polymers. The pores resemble fissures and cracks. This type of porosity decreases in effectiveness over time.

The membranes of the present invention have pores formed by long-chain polyoxyalkylene tentacles which are chemically joined to a carbon backbone having at least about 50 carbon atoms. The polyoxyalkylene tentacles contain about 20 to about 100 oxyalkylene units. These units impart hydrophilicity to the pores so as not to repel water molecules. Also, the water molecules are small enough to pass through the pores, the size of the pores being about 3.1 angstroms to about 4.5 angstroms in diameter. The length of the pores is about 10 angstroms to about 150 angstroms.

Polymeric additives of the present invention are sufficiently lipophilic to be readily dissolved in common organic solvents. They are also sufficiently hydrophilic to be very swellable in the presence of water, although they are not crosslinked. The additives, when incorporated into membranes, are sufficiently stable to allow high flux. This is because they are non-ionic and thus are not depleted by reactions with salts or charged materials.

Materials which are retained by the ultrafiltration membranes of the present invention are inorganic salts, which have a diameter of about 6 angstroms to about 8 angstroms. Also retained by the membranes are bacteria, which have a diameter of about 10 angstroms or more. In general, any materials having a diameter of about 5 angstroms or greater are retained by the membranes. The diameter of a water molecule is about 2.4 angstroms.

Addition of minor amounts of polymeric additives disclosed herein to conventional polymers useful in ultrafiltration processes provides a membrane structure which can be operated at elevated pressures to remove salts and other impurities from water. The improved membrane structure increases rate of flow of purified water and increases rejection of salts, bacteria and molecular contaminants above about 5 angstroms in diameter. Since the membrane contains polymeric additives which are non-ionic, the membrane is not depleted by interaction with ionic species such as salts and the like. Hard water, containing various salts and minerals, can thus be employed in an ultrafiltration process, wherein the selection membrane contains polymeric additives presently disclosed.

The polyoxyalkylene alkyl phenyl ester of (meth)acrylic acid can be prepared from (meth)acrylic acid or a suitable derivative thereof and an active hydrogen-containing polyoxyalkylene alkyl phenyl compound. The phrase "(meth) acrylic acid" refers to both acrylic acid and methacrylic acid. In a preferred embodiment, the active hydrogen-containing polyoxyalkylene alkyl phenyl compound is a member selected from the group consisting of PEG-20 nonyl phenyl ether, PEG-30 nonyl phenyl ether, PEG-40 nonyl phenyl ether and PEG-50 nonyl phenyl ether.

In an alternative embodiment, the polyoxyalkylene alkyl phenyl compound can contain a polyoxyalkylene group which is made up of alternating blocks of polyoxyethylene and polyoxypropylene. In another embodiment, the polyoxyalkylene group can be made up of polyoxybutylene or alternating blocks of polyoxybutylene and a second polyoxyalkylene which is a member selected from the group consisting of polyoxyethylene and polyoxypropylene.

The length of the polyoxyalkylene side chains which extend from the carbon backbone is about 10 angstroms to about 150 angstroms. In a preferred embodiment, the distance between the polyoxyalkylene side chains is from about 2 angstroms to about 120 angstroms. Preferably the distance between side chains is about 8 angstroms.

The physical form of the hydrophilic membrane, which comprises a hydrophobic polymer in admixture with a polymer additive prepared from a vinyl monomer of a polyoxyalkylene alkyl phenyl ether, can be a film or a fiber. Preferably, the vinyl monomer is a (meth)acrylic acid ester. The polymer prepared from the vinyl monomer is present in the ultrafiltration membrane in an amount of about 0.1 parts by weight to about 10 parts by weight, based on the weight of the membrane. In a preferred embodiment, the polymer prepared from the vinyl monomer is present in the membrane in an amount of about 0.5 to about 5 parts by weight, based on the weight of the membrane. The molecular weight of the polymer additive is about 5,000 to 500,000.

The present application discloses a process for preparing a composite microporous ultrafiltration membrane comprising the steps of: obtaining a water-insoluble addition copolymer of a first comonomer comprising an alkylphenoxy polyalkylene glycol acrylate having the formula:

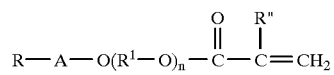

wherein R is an alkyl radical of from 5 to 20 carbon atoms, A is a phenylene radical, $R^1$ is a member selected from the group consisting of ethylene, propylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1; dissolving the addition copolymer in an organic solvent to obtain a solution of copolymer; adding the solution of copolymer to a film-forming composition comprising a hydrophobic polymer; casting the film-forming composition to obtain a composite polymer film; and forming an ultrafiltration membrane from the composite polymer film. Preferably, R—A— is a nonyl phenyl radical, R" is hydrogen and $R^1$ is ethylene.

In another embodiment, the present application discloses a process for preparing a composite microporous ultrafiltration membrane comprising the steps of: obtaining a water-insoluble addition copolymer of a first comonomer comprising an alkylphenoxy polyalkylene glycol acrylate having the formula:

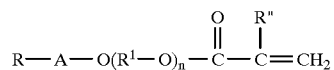

wherein R is an alkyl radical of from 5 to 20 carbon atoms, A is a phenylene radical, $R^1$ is a member selected from the group consisting of ethylene, propylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1; dissolving the addition copolymer in an organic solvent to obtain a solution of copolymer; adding the solution of copolymer to a film-forming composition comprising a hydrophobic polymer; forming the composition to obtain a composite polymer fiber; and forming a hollow-fiber ultrafiltration membrane from the composite polymer fiber.

In both of the above-disclosed processes, the hydrophobic polymer is preferably a member selected from the group consisting of cellulosic polymers, polyamides, polycarbonates and polysulfones.

Also, in a preferred embodiment the process employs an acrylate addition polymer prepared from a monomer of the above-disclosed formula and wherein RA— is a nonyl phenyl radical, R" is hydrogen, and $R^1$ is ethylene. Preferably, the water-insoluble addition polymer is added to the film-forming composition in an amount of about 1% to about 10% by weight based on the membrane.

A hydrophilic membrane is disclosed comprising a hydrophobic polymer in admixture with a copolymer prepared from a first comonomer which is a polyoxyalkylene alkyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and admixtures thereof, wherein the molar ratio of second comonomer to first comonomer is about 0.5:1 to about 20:1. In a preferred embodiment, the ester is prepared from an active hydrogen compound which is a member selected from the group consisting of PEG-20 nonyl phenyl ether, PEG-30 nonyl phenyl ether, PEG-40 nonyl phenyl ether and PEG-50 nonyl phenyl ether. Most preferably, the vinyl monomer is prepared from a polyoxyethylene nonyl phenyl ether.

A material for purification and desalinization of water is disclosed comprising a copolymer prepared by addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1; whereby the copolymer has oxyalkylene side chains on a carbon backbone. Preferably, the polymer has a molecular weight of about 5,000 to about 500,000.

Another aspect of the present disclosure is a process for preparing water which is pure and potable from a feedstream comprising salt water or brackish water. The process comprises the steps of: obtaining a microporous ultrafiltration membrane comprising a hydrophobic polymer and a copolymer prepared by the addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1; contacting an amount of seawater with the ultrafiltration membrane under reverse osmosis conditions to effectively separate water from salts, bacteria, organic contaminants, inorganic contaminants and microorganisms; and withdrawing a purified stream of water.

Broadly, the present application discloses a hydrophilic composite microporous membrane comprising a first copolymer prepared from a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1; and a second polymer which is a member selected from the group consisting of cellulosic polymers, polyamides, polycarbonates and polysulfones. The first polymer is present in an amount of about 0.1 parts by weight to about 10 parts by weight. The physical form of the membrane is a film or a fiber. The polyoxyalkylene moiety is a member selected from the group consisting of polyoxyethylene, polyoxypropylene, or mixtures thereof.

The comonomers which do not have the polyoxyalkylene moiety are present in the first polymer in an amount from about 50 to about 2,000 mole %. The first polymer is not cross-linked and is non-ionic. The first polymer is readily swellable in the presence of water because of the hydrophilicity of the polyoxyalkylene side chains. However, the side chains are durable to the extraction of water and greatly improve rate of flow of water through the ultrafiltration membrane.

In a preferred embodiment, the polyoxyalkylene-containing polymer has a carbon backbone which has a length from about 200 carbon atoms to about 2,000 carbon atoms.

In order to retain smaller molecules, such as salts, in a separation process, the polymeric additive must be constructed so that the smaller molecules are retarded in their migration down the pathways created by the polyoxyalkylene tentacles dangling from the carbon backbone. This can be achieved by increasing the spacing between the polyether tentacles on the backbone by at least one other vinyl monomer having some degree of polarity. Examples of useful monomers are acrylonitrile, salts of vinyl sulfonic acid, lower alkyl (meth)acrylates, N-vinyl pyrrolidone, acrylamide and the like.

To increase compatibility of the polymeric additives, namely the copolymers prepared from polyoxyalkylene alkyl phenyl ester of (meth)acrylic acid, with the conventional polymers useful in ultrafiltration processes; vinyl monomers are chosen for the reaction with the polyoxyalkylene esters so that said vinyl monomers are chemically similar to the solvents for the conventional polymer. As an example, if the conventional polymer is soluble in dimethyl acetamide, the vinyl monomer could be dimethyl acrylamide. If the conventional polymer is soluble in N-methyl pyrrolidone, the vinyl monomer could be N-vinyl pyrrolidone. Whichever vinyl monomer is chosen for preparing a copolymer with the polyoxyalkylene alkyl phenyl acrylate ester, the only stipulation is molar ratio of vinyl monomer to polyoxyalkylene ester is about 0.5 to about 20.

Another consideration is the rate of flow of water through the ultrafiltration membrane. To increase the rate of flow, the vinyl monomer employed to increase the spacing of the polyoxyalkylene alkyl phenyl groups on the polymeric backbone is chosen from monomers which will increase the swellability of the final copolymer. Examples of such vinyl monomers are vinyl sulfonates or acrylamide.

The present process can be employed to obtain retentate or concentrate such as organisms, monoclonal antibodies, or fruit juices. Many pharmaceutical processes produce very dilute "brew" of organisms or monoclonal antibodies. This brew can be concentrated by a reverse osmosis de-watering process to obtain the concentrate or retentate, while the filtrate is discarded.

The present disclosure also relates to a process for the separation of retentate from an aqueous system comprising the steps of: obtaining a microporous ultrafiltration membrane comprising a hydrophobic polymer and a copolymer prepared by the addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1; contacting the aqueous system with the ultrafiltration membrane under reverse osmosis conditions to effectively separate the desirables from the water; and withdrawing the retentate.

The objects, composition and effects of the present invention are further explained with reference to the following examples which illustrate the best mode currently contemplated for carrying out the invention but which must not be construed as limiting the invention in any manner.

All examples are parts by weight unless specified otherwise.

EXAMPLE 1

To a suitable reaction vessel equipped with stirrer and fractionation column is added IGEPAL CO-880 (200 parts), acrylic acid (20 parts), toluene (300 parts), nitrobenzene (1 part), hydroquinone (0.1 parts) and sulfuric acid (98%; 1 part). The fractionation column is arranged to remove an azeotrope of water, toluene and acrylic acid. Nitrobenzene prevents polymerization in the vapor phase, and hydroquinone prevents polymerization in the liquid phase.

The mixture of chemicals as recited above is heated to between about 120° C. and 140° C. and then refluxed for a time of about 16 hours. The reaction is complete when the reflux is a single phase. After completion of the reaction, the mixture is cooled to below 50° C. and solid sodium carbonate (20 parts) is quickly added to the mixture with stirring to neutralize the acid. While still warm the reaction mixture is filtered to recover a filtrate which is the desired monomeric product. The filtrate is heated at a temperature of about 60° C. to about 80° C. under reduced pressure of 10 mm to remove water and obtain a dry monomer product which melts at about 50° C. to about 60° C. Infrared analysis of the monomer exhibits absorptions for ester groups and ether groups.

EXAMPLE 2

To a suitable reaction vessel equipped with stirrer and fractionation column is added IGEPAL CO-880 (300 parts) ethyl acrylate (277 parts), 2,6-ditertbutyl-4-methyl-phenol (0.6 parts), EDTA (sodium salt) (0.3 parts). The reaction, which is conducted in a nitrogen atmosphere, is performed at a temperature of about 110° C. to about 120° C. When all traces of water have been removed, a catalytic amount of tetra-isopropyl titanate is added to the reaction mixture. Reflux temperature is maintained at about 85° C., and an azeotrope of ethanol/ethyl acrylate is removed. Temperature of the vessel is maintained at about 104° C. to about 110° C. to prevent yellowing of product. When distillate no longer contains ethanol, the excess ethyl acrylate is removed under vacuum. The reaction is worked up under standard conditions and a dry product is obtained having a melting point of about 50°–60° C.

EXAMPLE 3

Many methods of polymerizing the vinyl monomers can be employed. In the present example, polymers are prepared for later spinning into hollow-fibers.

To a reaction vessel equipped with a heating jacket is added dimethyl acetamide (100 parts), IGEPAL CO-880 acrylate monomer (100 parts), lauroyl peroxide (1 part), acrylamide (10 wt. %), sulfur dioxide (5% in dimethyl acetamide) (4 parts). The reaction mixture is stirred and heated at 70° C. for a time of about 2 hours. After conventional work-up, the reaction product is recovered as polymer in about 98% yield.

EXAMPLE 4

To a reaction vessel equipped with a heating jacket is added dioxane (100 parts), IGEPAL CO-880 acrylate monomer (100 parts), acrylamide (20 wt. %), bis-azodiisobutyronitrile (1 part). The reaction mixture is stirred and heated at 70° C. for a time of about 16 hours. After conventional work-up, the reaction product is recovered as polymer in about 95% yield.

EXAMPLE 5

To a reaction vessel equipped with a heating jacket and stirrer is added dimethyl acetamide (100 parts), acrylamido 2-methylpropane sulfonate (25 wt. %), triethyl amine (12.2 wt. %), IGEPAL CO-880 acrylate (98.86 parts), lauroyl peroxide (1 part), sulfur dioxide (5% in dimethyl acetamide) (4 parts). The reaction mixture is stirred and heated at 70° C. for a time of about 2 hours. After conventional work-up, the reaction product is recovered as polymer in about 95% to 98% yield. The polymer is slightly soluble in water. The presence of sulfonate groups in the polymer allows for increased water flow with membranes prepared from the polymer.

EXAMPLE 6

To a reaction vessel equipped with a heating jacket is added dimethyl acetamide (100 parts), acrylonitrile (40 wt. %), IGEPAL CO-880 acrylate (99.13 parts), lauroyl peroxide (1 part), sulfur dioxide (5% in dimethyl acetamide) (4 parts). The reaction mixture is stirred and heated at 70° C. for a time of about 2 hours. After conventional work-up, the reaction product is recovered as polymer in about 96% to about 98% yield. The polymer is lightly soluble in water. The presence of acrylamide residues in the polymer allows for increased hydrophilicity of the final polymer.

Although only preferred embodiments of the invention are specifically illustrated and described above, it will be appreciated that many modifications and variations of the present invention are possible in light of the above teachings and within the purview of the appended claims without departing from the spirit and intended scope of the invention.

I claim:

1. A composite microporous ultrafiltration membrane comprising a hydrophobic polymer and a water-insoluble addition copolymer comprising a first comonomer which is an alkylphenoxy polyalkylene glycol acrylate having the formula:

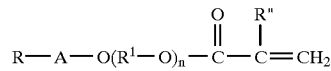

wherein R is an alkyl radical of from 5 to 20 carbon atoms, A is a phenylene radical, $R^1$ is a member selected from the group consisting of propylene, ethylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth) acrylates, N-vinyl pyrrolidone and mixtures thereof, wherein the molar ratio of second comonomer to first comonomer is about 0.5:1 to about 20:1.

2. A membrane according to claim 1 wherein R—A— is a nonyl phenyl radical, R" is hydrogen and $R^1$ is ethylene.

3. A membrane according to claim 1 wherein the hydrophobic polymer is a member selected from the group consisting of cellulosic polymers, polyamides, polycarbonates and polysulfones.

4. A membrane according to claim 1 wherein the water-insoluble addition copolymer is present in an amount of about 1% to about 10% by weight based on the membrane.

5. A process for preparing a composite microporous ultrafiltration membrane comprising the steps of:

obtaining a water-insoluble addition copolymer of a first comonomer comprising an alkylphenoxy polyalkylene glycol acrylate having the formula:

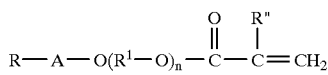

wherein R is an alkyl radical of from 5 to 20 carbon atoms, A is a phenylene radical, $R^1$ is a member selected from the group consisting of ethylene, propylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1;

dissolving the addition copolymer in an organic solvent to obtain a solution of copolymer;

adding the solution of copolymer to a film-forming composition comprising a hydrophobic polymer;

casting the film-forming composition to obtain a composite polymer film; and forming an ultrafiltration membrane from the composite polymer film.

6. A process for preparing a composite microporous ultrafiltration membrane comprising the steps of:

obtaining a water-insoluble addition copolymer of a first comonomer comprising an alkylphenoxy polyalkylene glycol acrylate having the formula:

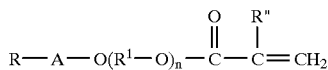

wherein R is an alkyl radical of from 5 to 20 carbon atoms, A is a phenylene radical, $R^1$ is a member selected from the group consisting of ethylene, propylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1;

dissolving the addition copolymer in an organic solvent to obtain a solution of polymer;

adding the solution of copolymer to a film-forming composition comprising a hydrophobic polymer;

forming the composition to obtain a composite polymer fiber; and forming a hollow-fiber ultrafiltration membrane from the composite polymer fiber.

7. A process according to claim 5 wherein the hydrophobic polymer is a member selected from the group consisting of cellulosic polymers, polyamides, polycarbonates and polysulfones.

8. A process according to claim 6 wherein the hydrophobic polymer is a member selected from the group consisting of cellulosic polymers, polyamides, polycarbonates and polysulfones.

9. A processing according to claim 5 wherein the water-insoluble addition polymer is added to the film-forming composition in an amount of about 1% to about 10% by weight based on the membrane.

10. A process according to claim 6 wherein the water-insoluble addition polymer is added to the fiber-forming composition in an amount of about 1% to about 10% by weight based on the membrane.

11. A process for the preparation of purified water comprising the steps of:

obtaining a microporous ultrafiltration membrane comprising a hydrophobic polymer and about 1% to about 10% by weight based on the membrane of a water-insoluble addition copolymer comprising a first comonomer which is an alkylphenoxy polyalkylene glycol acrylate having the formula:

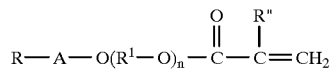

wherein R is an alkyl radical of from 5 to 20 carbon atoms, A is a phenylene radical, $R^1$ is a member selected from the group consisting of propylene, ethylene and mixtures thereof, R" is a member selected from the group consisting of hydrogen and methyl, and n is an integer from 20 to 100; and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1;

contacting an amount of unpurified water with the ultrafiltration membrane under reverse osmosis conditions to effectively separate water from salts, bacteria, organic contaminants, inorganic contaminants and microorganisms; and withdrawing a purified stream of water.

12. A process according to claim 11 wherein the hydrophobic polymer is a member selected from the group consisting of cellulosic polymers, polyamides, polycarbonates and polysulfones.

13. A process according to claim 11 wherein RA— is a nonyl phenyl radical, R" is hydrogen and $R^1$ is ethylene.

14. A hydrophilic composite microporous membrane comprising a first copolymer prepared from a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1; and a second polymer which is a member selected from the group consisting of cellulosic polymers, polyamides, polycarbonates and polysulfones.

15. A membrane according to claim 14 wherein the first polymer is present in an amount of about 0.1 parts by weight to about 10 parts by weight.

16. A membrane according to claim 14 wherein the physical form is a film or a fiber.

17. A membrane according to claim 14, wherein the polyoxyalkylene moiety is a member selected from the group consisting of polyoxyethylene, polyoxypropylene, and mixtures thereof.

18. A membrane according to claim 17 wherein the polyoxyethylene moiety is a functional part of a compound which is a member selected from the group consisting of PEG-20 nonyl phenyl ether, PEG-30 nonyl phenyl ether, PEG-40 nonyl phenyl ether and PEG-50 nonyl phenyl ether.

19. A hydrophilic membrane comprising a hydrophobic polymer in admixture with a copolymer prepared from a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and admixtures thereof, wherein the molar ratio of second comonomer to first comonomer is about 0.5:1 to about 20:1.

20. A membrane according to claim 19 wherein the ester is prepared from an active hydrogen compound which is a member selected from the group consisting of PEG-20 nonyl phenyl ether, PEG-30 nonyl phenyl ether, PEG-40 nonyl phenyl ether and PEG-50 nonyl phenyl ether.

21. A hydrophilic membrane comprising a hydrophobic polymer in admixture with a copolymer prepared from a first comonomer which is a vinyl monomer of a polyoxyalkylene alkyl phenyl ether and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1.

22. A membrane according to claim 21 wherein the vinyl monomer is prepared from a polyoxyethylene nonyl phenyl ether.

23. A material for purification and desalinization of water comprising a copolymer prepared by addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1; whereby the copolymer has oxyalkylene side chains on a carbon backbone.

24. A material according to claim 23 wherein the ester is prepared from a polyoxyethylene nonyl phenyl ether.

25. A material according to claim 23 wherein the polymer has a molecular weight of about 5,000 to about 500,000.

26. A material according to claim 23 wherein the polymer has a distance between oxyalkylene chains on the carbon backbone of about 2 angstroms to about 120 angstroms.

27. A material according to claim 26 wherein the distance between chains is about 8 angstroms.

28. A material according to claim 23 wherein the length of the chains is about 10 angstroms to about 150 angstroms.

29. A material according to claim 23 wherein the length of the carbon backbone is from about 200 carbon atoms to about 2,000 carbon atoms.

30. A process for the preparation of purified desalinated water comprising the steps of:

obtaining a microporous ultrafiltration membrane comprising a hydrophobic polymer and a copolymer prepared by the addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1;

contacting an amount of seawater with the ultrafiltration membrane under reverse osmosis conditions to effectively separate water from salts, bacteria, organic contaminants, inorganic contaminants and microorganisms; and withdrawing a purified stream of water.

31. A process according to claim 30 wherein the hydrophobic polymer is a member selected from the group consisting of cellulosic polymers, polyamides, polycarbonates and polysulfones.

32. A process for the separation of retentate from an aqueous system comprising the steps of:

obtaining a microporous ultrafiltration membrane comprising a hydrophobic polymer and a copolymer prepared by the addition polymerization of a first comonomer which is a polyoxyalkylene alkyl phenyl ester of (meth)acrylic acid and a second comonomer which is a member selected from the group consisting of vinyl sulfonic acid salts, acrylamide, N-substituted acrylamides, acrylonitrile, lower alkyl (meth)acrylates, N-vinyl pyrrolidone and mixtures thereof, wherein the molar ratio of second comonomer to first comonomer is about 0.5:1 to about 20:1;

contacting the aqueous system with the ultrafiltration membrane under reverse osmosis conditions to effectively separate the desirables from the water; and withdrawing the retentate.

33. A process according to claim 32 wherein the hydrophobic polymer is a member selected from the group consisting of cellulosic polymers, polyamides, polycarbonates and polysulfones.

* * * * *